US011869757B2

(12) United States Patent
Jurek et al.

(10) Patent No.: US 11,869,757 B2
(45) Date of Patent: Jan. 9, 2024

(54) DETECTOR COMPRISING TRANSMISSION SECONDARY ELECTRON EMISSION MEANS

(71) Applicant: ADAPTAS SOLUTIONS PTY LTD, Clyde (AU)

(72) Inventors: Russell Jurek, Clyde (AU); Kevin Hunter, Clyde (AU); Antony Jones, Clyde (AU); Aditya Wakhle, Clyde (AU)

(73) Assignee: ADAPTAS SOLUTIONS PTY LTD, Clyde (AU)

( * ) Notice: Subject to any disclaimer, the term of this patent is extended or adjusted under 35 U.S.C. 154(b) by 128 days.

(21) Appl. No.: 17/616,831

(22) PCT Filed: Jun. 5, 2020

(86) PCT No.: PCT/AU2020/050581
§ 371 (c)(1),
(2) Date: Dec. 6, 2021

(87) PCT Pub. No.: WO2020/243795
PCT Pub. Date: Dec. 10, 2020

(65) Prior Publication Data
US 2022/0293402 A1   Sep. 15, 2022

(30) Foreign Application Priority Data

Jun. 7, 2019 (AU) .................................. 2019901981

(51) Int. Cl.
*H01J 43/10* (2006.01)
*H01J 43/02* (2006.01)
(Continued)

(52) U.S. Cl.
CPC .............. *H01J 43/10* (2013.01); *H01J 43/02* (2013.01); *H01J 43/28* (2013.01); *G01T 1/28* (2013.01); *H01J 49/025* (2013.01); *H01J 49/26* (2013.01)

(58) Field of Classification Search
CPC .... H01J 43/10; H01J 43/02; H01J 1/32; H01J 43/246
See application file for complete search history.

(56) References Cited

U.S. PATENT DOCUMENTS

| 3,541,331 A | 11/1970 | Hunt, Jr. et al. |
| 4,419,603 A | 12/1983 | Nussli et al. |

(Continued)

FOREIGN PATENT DOCUMENTS

| EP | 1521286 A1 | 4/2005 |
| EP | 1939917 A2 | 7/2008 |

(Continued)

OTHER PUBLICATIONS

International Search Report dated Jul. 27, 2020 for corresponding PCT/AU2020/050581 filed on Jun. 5, 2020.

(Continued)

*Primary Examiner* — Joseph L Williams
(74) *Attorney, Agent, or Firm* — David D. Brush; Westman, Champlin & Koehler, P.A.

(57) ABSTRACT

Ion detectors of the type used in scientific instrumentation, such as mass spectrometers. More particularly, a self-contained particle detector includes an enclosure formed in part by a transmission mode secondary electron emissive element, the enclosure defining an internal environment and an external environment, wherein the transmission mode secondary electron emissive element has an externally facing surface and an internally facing surface and is configured such that impact of a particle on the externally facing surface (Continued)

causes emission of one or more secondary electrons from the internally facing surface.

15 Claims, 6 Drawing Sheets

(51) Int. Cl.
*H01J 1/32* (2006.01)
*H01J 43/24* (2006.01)
*H01J 43/28* (2006.01)
*G01T 1/28* (2006.01)
*H01J 49/02* (2006.01)
*H01J 49/26* (2006.01)

(56) References Cited

U.S. PATENT DOCUMENTS

| | | |
|---|---|---|
| 2011/0095174 A1 | 4/2011 | Suyama et al. |
| 2011/0095177 A1 | 4/2011 | Giannakopulos et al. |

FOREIGN PATENT DOCUMENTS

| | | |
|---|---|---|
| WO | 2012067954 A2 | 5/2012 |
| WO | 2017059558 A1 | 4/2017 |

OTHER PUBLICATIONS

Written Opinion dated Jul. 27, 2020 for corresponding PCT/AU2020/050581 filed on Jun. 5, 2020.

DETECTOR COMPRISING TRANSMISSION SECONDARY ELECTRON EMISSION MEANS

The present application is a Section 371 National Stage Application of International Application No. PCT/AU2020/050581, filed Jun. 5, 2020 and published as WO 2020/243795 A1 on Dec. 10, 2020, in English, which claims priority from Australian provisional patent application 2019901981, filed Jun. 7, 2019, the contents of which are hereby incorporated by reference in their entireties.

FIELD OF THE INVENTION

The present invention relates generally to components of scientific analytical equipment, and to complete items of analytic equipment. More particularly, but not exclusively, the invention relates to ion detectors of the type used in scientific instrumentation, such as mass spectrometers. More particularly, the present invention provides an alternative to a prior art photomultiplier tube, or other contrivance useful as a scintillation counter. Apart from mass spectrometers, the invention may be used in radiation detection whereby alpha and beta radiation trigger the generation of photons by the scintillator.

BACKGROUND TO THE INVENTION

Mass analysis involves the separation of ions according to their mass-to-charge (m/z) ratio. The separation of ions on that basis is the central function of a mass spectrometer. Once separated, the ions must be detected in some accurate and reliable method. The vast majority of mass spectrometers include a discrete ion detector, a notable exception being those incorporating a combined mass analyser and detector such as an FT-ICR mass spectrometer.

The ion detectors with the longest operating life are photomultiplier tubes paired with a scintillator, such an arrangement being alternatively termed a scintillation counter. Accordingly, photomultiplier tubes are used in situations where their ability to achieve greater than 10 years of operational life under the right conditions is critical to the application.

In a photomultiplier tube, ions or electrons initially strike a scintillator screen (typically comprising phosphorus) which in turn releases a burst of photons. The photons then pass into the multiplier tube and are then converted into electrons by a photocathode. These electrons are then directed into an electron multiplier sealed inside the tube to generate a signal detectable with conventional electronics. In the art of mass spectrometry, the term "photomultiplier tube" is taken to mean the combination of a photomultiplier tube and a scintillator.

An advantage of converting ions or electrons into photons and back to electrons is that the multiplier may be maintained in a sealed vacuum environment with a thick glass enclosure (being the tube) thereby preventing contamination of emissive surfaces, leading in turn to an extended service life.

A problem associated with photomultiplier tubes arises from the decay time of the meta-stable state induced in the scintillator when impacted by an ion or an electron. The decay of this meta-stable state, which produces the required photons, creates temporal noise. This reduces the timing resolution achievable with a photomultiplier tube, limiting suitability for use in high-performance time-of-flight mass spectrometry. Additionally, the nature of meta-stable decay can cause photomultiplier tubes to produce non-Gaussian pulses with trailing tails. This is disadvantageous when a photomultiplier tube is used for time-of-flight or pulse counting as it may obscure the presence of a small signal adjacent to a large signal.

It is an aspect of the present invention to provide improvements in means for ion detection. It is a further aspect of the prior art to provide a useful alternative to prior art photomultiplier tubes.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each provisional claim of this application.

SUMMARY OF THE INVENTION

In a first aspect, but not necessarily the broadest aspect, the present invention provides a self-contained particle detector comprising an enclosure formed in part by a transmission mode secondary electron emissive element, the enclosure defining an internal environment and an external environment, wherein the transmission mode secondary electron emissive element has an externally facing surface and an internally facing surface and is configured such that impact of a particle on the externally facing surface causes emission of one or more secondary electrons from the internally facing surface.

In one embodiment of the first aspect, the transmission mode secondary electron emissive element has the structure and/or function of a transmission dynode.

In one embodiment of the first aspect, the transmission mode secondary electron emissive element comprises two or more electron emissive sub-elements.

In one embodiment of the first aspect, each of the two or more electron emissive sub-elements has the structure and/or or function of a transmission dynode.

In one embodiment of the first aspect, the enclosure prevents or inhibits the movement of a contaminant from the external environment to the internal environment.

In one embodiment of the first aspect, the enclosure comprises a walled structure, and the transmission mode secondary electron emissive element is substantially continuous with a wall of the walled structure.

In one embodiment of the first aspect, the enclosure forms a sealed or a substantially sealed arrangement.

In one embodiment of the first aspect, the self-contained particle detector comprises electron amplification means configured to amplify a secondary electron emitted from the transmission mode secondary electron emissive element.

In one embodiment of the first aspect, the electron amplification means is an electron multiplier.

In one embodiment of the first aspect, the electron multiplier is a discrete dynode electron multiplier, or a continuous electron multiplier, or a multi-channel continuous electron multiplier, or a cross-field detector (such as the magneTOF™), or a microchannel plate (MCP) detector.

In one embodiment of the first aspect, the detector comprises electron collection means in operable association with the electron amplification means.

In one embodiment of the first aspect, the electron collection means is an anode.

In one embodiment of the first aspect, the electron amplification means and the electron collection means are contained wholly within the enclosure.

In one embodiment of the first aspect, the self-contained particle detector is configured as a component to replace a photomultiplier tube or scintillation counter or to replace a scintillation counter for radiation detection.

In a second aspect, the present invention provides the combination of the self-contained particle detector of any embodiment of the first aspect and a conversion dynode, wherein the conversion dynode is in operable association with the self-contained particle detector such that a secondary electron emitted by the conversion dynode is capable of impacting the externally facing side of the transmission mode secondary electron emissive element.

In a third aspect, the present invention provides the combination of the self-contained particle detector of any embodiment of the first aspect and electron amplification means, wherein the electron amplification means is in operable association with the self-contained particle detector such that a secondary electron emitted by the electron multiplier is capable of impacting the externally facing side of the transmission mode secondary electron emissive element.

In a fourth aspect, the present invention provides a mass spectrometer comprising the self-contained particle detector of any embodiment of the first aspect, or the combination of the second aspect, or the combination of the third aspect.

In a fifth aspect, the present invention provides a method for maintaining a mass spectrometer, the method comprising the steps of replacing a photomultiplier tube of a mass spectrometer with the self-contained particle detector of any embodiment of the first aspect.

In a sixth aspect, the present invention provides a method for detecting a particle, the method comprising causing or allowing a particle to impact an externally facing side of transmission mode secondary electron emissive element which forms part of an enclosure, and causing or allowing the transmission mode secondary electron emissive element to emit a secondary electron from an internally facing side of the transmission mode secondary electron emissive element.

In one embodiment of the sixth aspect, the transmission mode secondary electron emissive element which forms part of an enclosure is provided by the self-contained particle detector of any embodiment of the first aspect.

BRIEF DESCRIPTION OF THE FIGURES

Unless otherwise stated, items marked with the same numeral across the various drawings are directed to the same or equivalent items.

DETAILED DESCRIPTION OF THE INVENTION AND PREFERRED EMBODIMENTS THEREOF

Figure 1:
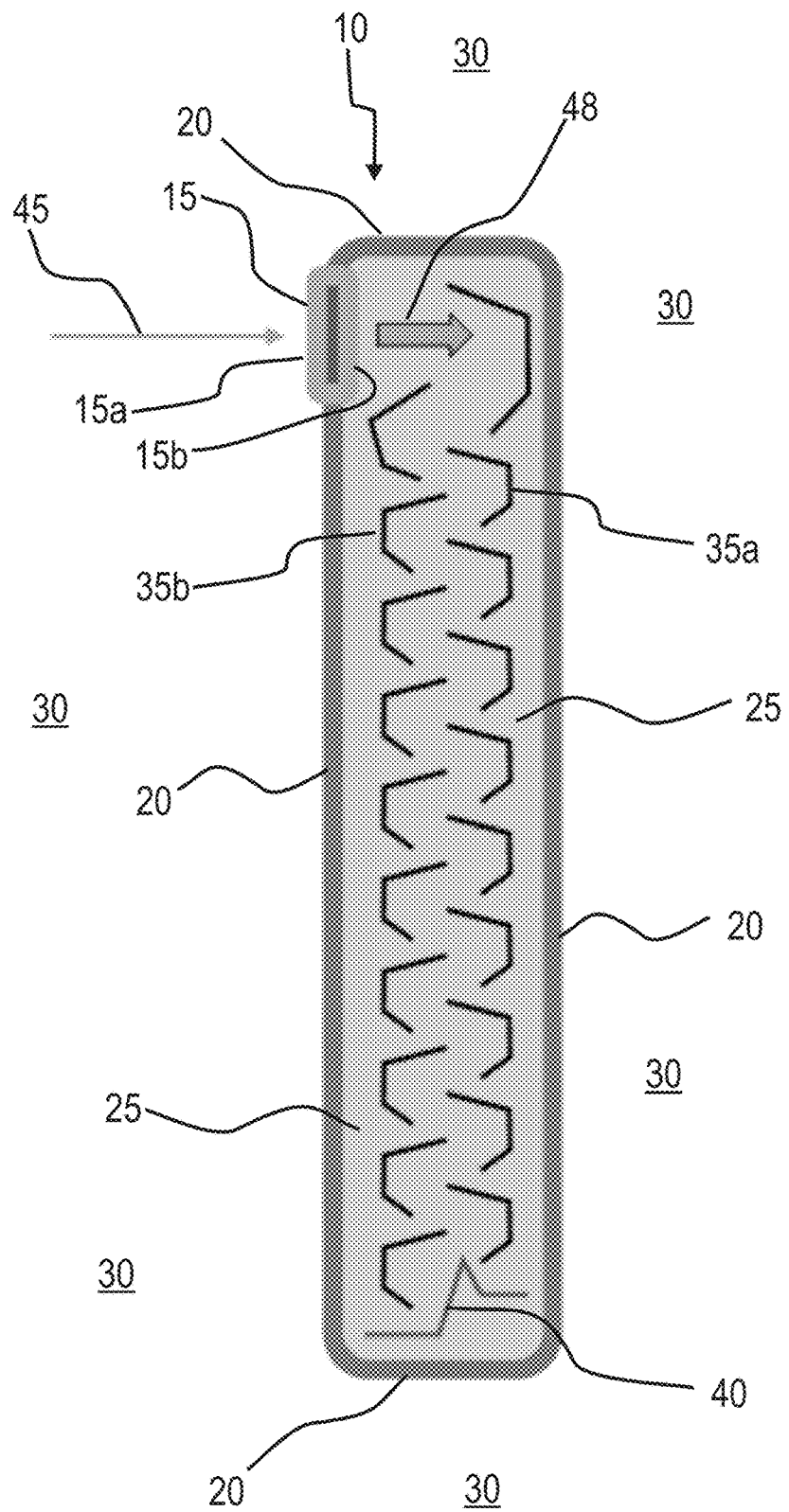
FIG. 1 illustrates highly diagrammatically a preferred substantially sealed particle detector of the present invention.

After considering this description it will be apparent to one skilled in the art how the invention is implemented in various alternative embodiments and alternative applications. However, although various embodiments of the present invention will be described herein, it is understood that these embodiments are presented by way of example only, and not limitation. As such, this description of various alternative embodiments should not be construed to limit the scope or breadth of the present invention. Furthermore, statements of advantages or other aspects apply to specific exemplary embodiments, and not necessarily to all embodiments covered by the claims.

Throughout the description and the claims of this specification the word "comprise" and variations of the word, such as "comprising" and "comprises" is not intended to exclude other additives, components, integers or steps.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may.

The present invention represents an improvement or at least an alternative to prior art photomultiplier tubes. In one sense, the invention may be considered as a modification to a prior art photomultiplier tube to replace the scintillator with a transmission mode dynode. In that regard, a detector of the present invention may be generally structurally similar to a prior art photomultiplier tube having a similar shape, size, electrical connectors and the like, and to a large extent fabricated from similar materials, the main difference being the substitution of the scintillator with a transmission mode dynode.

In another sense, the invention may be considered as a novel use of a transmission mode dynode, with construction of the detector comprising the dynode bearing little or no resemblance to that of a photomultiplier tube. The dynode may be incorporated into a structure not related in any way to the photomultiplier tube, such that the structure in combination with the dynode forms a substantially sealed enclosure. In that regard, the detector enclosure may be formed predominantly from non-vitreous materials including polymers, ceramics, metals and the like. As for the transmission mode dynode, the material and construction of the remainder of the enclosure should be designed to prevent or inhibit the passage of a gas or other contaminant into the internal environment of the detector. Thus, the enclosure may be generally designed to as to avoid or limit any joins and may indeed be of generally unitary construction (with the exception of the dynode, which should of course be separate to the remainder of the enclosure structure).

In any event, the transmission mode dynode functions so as to receive a particle (electron, ion, or other) on one face, and to emit one or more secondary electrons from an opposing face. In the context of the present invention, the transmission mode dynode performs an additional function in that it forms a physical part of an enclosure. For example, the transmission mode dynode may be incorporated into a wall of a tube, the combination of tube and dynode providing a substantially sealed enclosure. In that regard, the transmission mode dynode may be considered as an interface between the environment internal the detector and the environment external the detector. The interface may be considered as means to seal the detector internal environment from the detector external environment while still allowing for a particle in the external environment to generate electron flux inside the detector.

As will be appreciated, given that one of the functions of the transmission mode dynode is to seal the detector internal environment, the dynode will be fabricated from materials and in a manner that prevents or at least substantially prevents the passage of gaseous species from passing therethrough and into the detector internal environment. Furthermore, the dynode should interface with wall(s) of the detector so as to prevent or at least substantially inhibit the passage of any gaseous species passing around the dynode and into the detector internal environment.

Where the transmission dynode forms an interface with a wall portion of the detector, a sealant may be used in the interface. The sealant may have adhesive properties also to facilitate bonding to the surface of a discontinuity, and also surrounding material so as to prevent dislodgement in the course of a vacuum being formed and broken as is routine in the vacuum chamber of a mass spectrometer.

Suitable sealants/adhesives may include a structure of fused powdered glass, a solder, a polymer such as a polyimide (optionally in tape form, such as Kapton™ tape). Preferably the sealant/adhesive is one that, once cured or fused, minimally contributes to "virtual leak" in that it does not substantially desorb a liquid, a vapour or a gas into the chamber under vacuum. Such materials are often termed in the art "vacuum safe". Desorbed substances can have detrimental effects on a vacuum pumping system of a mass spectrometer.

The interface between the transmission dynode and the main detector (or parts of the main detector) may be constructed so as to prevent or at least inhibit the molecular or transitional flow of gas into the detector. Such interfaces may be configured to define a non-linear or tortuous path from external the detector to internal the detector. The non-linear or tortuous path may comprise a series of bends and/or curves and/or corners. As another possibility, a lip may be formed about an interface to limit the transmission of gas through the interface.

In some embodiments of detector, two portions of the detector do not form an interface and instead a space is defined therebetween. The space may allow for non-conventional fluid flow (such as transitional and/or molecular flow) of a gas external to internal the detector. To inhibit or prevent the flow of gas through the space, a deformable member or a deformable mass may be disposed in the space. The member or mass is configured to occupy the space by deforming (for example by, flexing, stretching, compressing, expanding, or oozing). The deformation (and therefore occlusion or partial occlusion) may be caused by the movement of one element relative to the other. Otherwise, the two elements remain in fixed spatial relationship but the deformable member or mass is caused or allowed to occupy the space therebetween.

In addition to the configuration of detector interfaces as described above, further structural features may be incorporated into a detector. As a first feature, the external surface of the detector enclosure may consist of as few continuous pieces as possible. Preferably, the enclosure is fabricated from a single piece of material so as to provide a continuous external surface, and in that case any discontinuities may be sealed with a sealant.

Suitable transmission dynode materials include: silicon oxides (SiO), gold (Au), potassium chloride (KCl), aluminium (Al), aluminium oxide ($Al_2O_3$), cesium iodide (CsI), gallium arsenic (GaAs) and carbon based materials such as diamond, doped diamond and diamond-like materials. Thicknesses may range from about 1 nm to about 50 nm in some embodiments, or up to about 1 mm in other embodiments. The dynode material may be incorporated into the enclosure using the sealants mentioned elsewhere herein.

Sealing the detector internals allows for electron emissive surfaces within the detector (such as an electron multiplier) or electron collection surfaces (such as collector anode) to be maintained substantially free from contaminants that are typically found in the vacuum chamber of a mass spectrometer. For example, where a mass spectrometer is coupled to a separation apparatus (such as a gas chromatography apparatus), it may be desirable to inhibit or prevent entry of a sample carrier gas into the detector. Carrier gases (such as hydrogen, helium and nitrogen) are used to conduct sample to the ionization means of a mass spectrometer in which the detector is installed. Once the sample is ionized, the passage of the resulting ions is under control of the mass analyser, however residual carrier gas continues on beyond the mass analyser and toward the ion detector. In prior art detectors, no regard is had to the effect of the residual carrier gas on the service life and/or performance of the detector. The present invention may be used to prevent residual carrier gas (or other contaminants carried by a carrier gas) from fouling or otherwise interfering with the operation of the dynodes (being the amplifying electron emissive surfaces) of the detector, or the collector/anode of the detector.

Potential contaminants other than those associated with a carrier gas that can nevertheless adversely affect electron emission and collection surfaces may be similarly excluded by the detector.

The completely or partially enclosed emissive surfaces may be protected from exposure to atmosphere, to avoid or limit the undesirable gain recovery process. This process is thought to be the result of water molecules in air reaching emissive surfaces. This increases the secondary electron emission yield of these surfaces until the water is removed by incident electrons. This 'gain recovery' is therefore transient and undesirable. Completely or partially suppressing the gain recovery mechanism by preventing contact with water molecules may improve the 'gain stability' of the enclosed emissive surfaces.

In the context of the present invention, the term "transmission mode secondary electron emissive element" is taken to include a repurposed transmission dynode of the prior art, which may be used "as is" or with some modification to confer usefulness or improve suitability as useful in the context of the present invention. Alternatively, the element may be created de novo, and without reference to any existing dynode.

In some embodiments, transmission dynode is formed by layering a carbon based substance (such as microcrystalline diamond) onto a substrate for mechanical support, the substrate being generally permissive to the passage of secondary electrons. Given the benefit of the present specification the skilled person is enabled to identify a range of electron emissive materials and constructions thereof to achieve the general aim of the present invention to provide a detector which is substantially sealed against the external environment.

A prior art transmission mode dynode typically consists of a stack of elements that emit secondary electrons when struck by charged particles. In a preferred form, the present detector uses a single element of a transmission multiplier as an interface for forming part of the detector enclosure. Transmission multipliers are constructed by using multiple transmission elements analogous to the multiple elements in a discrete dynode electron multiplier.

Two limitations that are problematic are high operating voltages and limited mechanical and structural strength. A transmission element in a transmission multiplier, requires a high operating voltage (typically >=2 kV) to operate. The thicker the transmission element, the higher the voltage must be. This creates a competition between a practical operating voltage and a practical thickness. This balance shifts towards even thinner transmission elements, when multiple elements are stacked to create a transmission multiplier. The resultant operating voltage for a transmission multiplier can be as high as 20 kV for a brand-new transmission multiplier. As the transmission multiplier ages, this voltage will need to be increased to maintain the required gain. This can require very high voltages exceeding 30 kV. These limitations, and their competing requirements, have prevented the realisation of a commercially viable transmission multiplier.

A transmission element typically requires a higher operating voltage (>=1.5 kV) to generate secondary electrons compared to a discrete dynode, continuous/channel or cross-field detector (~100V). This is because a transmission element emits secondary electrons from the side opposite to the one that was struck by ions or electrons. This requires incident charged particles hit with sufficient energy to generate this 'transmission' through the transmission element.

In another embodiment, the transmission mode secondary electron emissive element may comprise a plurality of sub-elements, each of which is fabricated from an electron emissive material, or is at least coated with an electron emissive material, or at least comprises an electron emissive outer region. The outwardly and inwardly facing surfaces of the present detector may be each provided by a single sub-element, or may be. each provided by a plurality of sub-elements which collectively form a surface of sorts.

In one embodiment, the sub-elements are fabricated from a resistive glass which is inherently conductive and then treatable so as to provide a native electron emissive layer.

The sub-elements are typically dimensioned generally uniformly in the range of microns, to tens of microns to hundreds of microns, and collocated in a packed arrangement. The sub-elements may be fabricated by a sintering method performed to provide spheres or spheroids dimensioned at the micron scale.

The sub-elements are typically shaped such that when packed, a plurality of spaces are formed which together provide routes by which a secondary electron may travel from its originating emissive surface and toward an emissive surface of another sub-element and generally toward the inwardly facing side of the transmission mode secondary electron emissive element. The sub-elements may be spheres or spheroids, such shapes providing close packing whilst maintaining useful spaces therebetween to allow for secondary electron travel.

Given the benefit of the present specification, the skilled person is able to optimize the material(s), shape, size and packing arrangement so as to suit a specific application for the present detector.

The sub-elements are typically maintained in packed form by a housing of some description to provide a volume of sub-elements, and a voltage is applied across the volume such that secondary electrons tend to travel toward the inward facing face of the transmission mode secondary electron emissive element.

In operation, an ion for detection may impact on a sub-element, thereby causing the emission of one of more secondary electrons. In that regard, the sub-element (and therefore the element as a whole) functions as an ion-to-electron converter. As will be appreciated, any secondary electron which is emitted from an impacted sub-element may travel via a space between sub-elements to impact on another sub-element.

In a particular embodiment of the invention, the transmission mode secondary electron emissive element as formed by a plurality of sub-elements may be constructed in accordance with a prior art microsphere electron multiplier (also known by the terms multisphere plate, microsphere multiplier, microsphere plate, and glass bead multiplier). In this context, the transmission mode secondary electron emissive element may be a repurposed microsphere electron multiplier of the prior art, which may be used "as is" or with some modification to confer usefulness or improve suitability as useful in the context of the present invention. Alternatively, the element may be created de novo, and without reference to any existing microsphere electron multiplier.

Where a microsphere multiplier of the prior is used, the skilled person having the benefit of the present specification may opt for any of the multipliers manufactured commercially, for example any of those supplied by El-Mul Technologies Ltd (Israel). The prior art provides non-commercial embodiments of microsphere multipliers, any of which may be constructed de novo (optionally with modifications) in producing a detector of the present invention. A prior art multiplier may be implemented in the present detectors as is, after minor modification, or after significant modification.

Applicant proposes a new use for microsphere electron multipliers in so far as such multipliers have previously been used only as a means for electron multiplication, as distinct from the present use in converting an incoming particle (that is not an electron) into an electron signal. In the new conversion role, the microsphere electron multiplier is not required to deliver the high gains (at least $10^3$) typically needed for useful electron multiplication. The ability to use lower gains will limit some negative aspects of the multisphere electron multiplier; viz noisy operation and large pulse height distribution (both being directly linked to high gains). By limiting the gain to less than about 500, 400, 300, 200, 100, and preferably about 10), these problems are avoided. Applicant has found that a prior art microsphere multiplier operated at a gain of less than about 100 is suitable operation as an ion-to-electron conversion device.

This low gain version of the multisphere multiplier, when operated solely or primarily to achieve ion-to-electron conversion, may be used as an alternative to a transmission multiplier dynode as an interface between the internal and external environments of the present detector. In one embodiment the multisphere multiplier is configured to maintain a pressure differential between the sealed, internal environment and the external environment. The following arrangements (which may also be exploited for any conversion arrangement comprising sub-elements more broadly) may be used to achieve a pressure differential.

In a first arrangement, a mixture of layered sphere sizes is used. The larger spheres are packed into the volume firstly to create the spaces allowing for electron travel. The larger spheres also provide the mechanical strength required to maintain the pressure differential between the internal and external detector environments. Subsequently, smaller spheres are packed into the volume to close or partially close or reduce the number of gaps in the external surfaces formed at the abutments of the larger spheres. If required, spheres of gradated size may be used, with increasingly smaller spheres disposed toward the external surfaces of the microsphere volume.

In a second alternative arrangement, the smaller spheres from the first arrangement (typically glass) are replaced with spheres fabricated from materials typically used in transmission multiplier dynodes (including but not limited to SiO, SiO/Au/KCl, SiO/KCl, Al/KCl, $Al_2O_3$/Al/CsI, $Al_2O_3$/Al/CsI(Cs), GaAs, Si, polycrystalline diamond, and single crystal diamond). This arrangement creates multiple transmission points inside the spaces formed by the abutment of the larger spheres. The smaller spheres mechanically plug the spaces, while also generating secondary electrons on the opposite side of an ion or electron impact.

In a third alternative arrangement, the second arrangement is extended such that the multisphere multiplier is coated on one or more external surfaces with a typical transmission multiplier dynode material (such materials recited supra).

In another embodiment of the invention, the transmission mode secondary electron emissive element is of a coated wire construction. In an exemplary construction, a grid of conductive wires is coated with a layer of material typically used in a transmission multiplier dynode (such materials recited supra). The coating forms transmissive elements in the spaces between the wires. Particles that strike the material in these spaces generate secondary electrons on the opposing side of the material.

The size and pitch of the wires may be adjusted so as to control the effective area of the transmission interface. A larger effective area (which is desirable) may compromise the mechanical strength required to bear the pressure differential between the external and internal environments of the present detector. Having the benefit of the present specification, the skilled person is enabled to trial wires of various size, pitch and coating in order to provide an useful effective area that provides useful mechanical strength.

In the process of applying the coating to the wire, the viscosity of the coating may need to be controlled within certain limits. As will be appreciated, the viscosity may dictate at least in part the thickness of the coating in the spaces between the wires, leading to a variation in the size of spaces formed between the wires. Thus, a variation in coating viscosity may be used to control the size of spaces formed between the coated wires.

Figure 7:
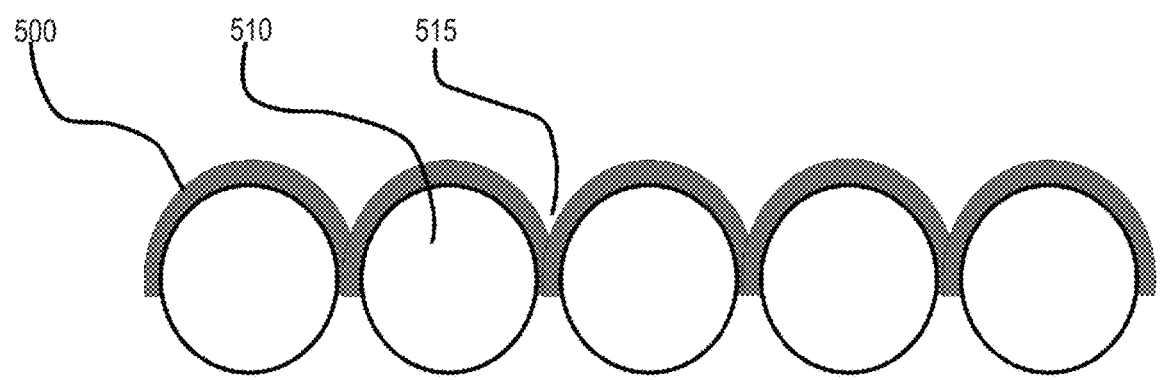
FIG. 7 illustrates highly diagrammatically, a coated wire construction used in one embodiment of the invention as a transmission mode secondary electron emissive element.

A coated wire construction is shown conceptually at FIG. 7; comprising a coating of transmission dynode material (500) applied to a grid of wires (one marked 510), so as to form transmission elements in the wire spaces (one marked 515).

In another embodiment of the invention, the transmission mode secondary electron emissive element is in the form of a channeled brace. The channeled brace may be of a triple region construction, with an inner region sandwiched between two outer regions. The inner region is a suitably thin layer of typical transmission dynode material (including those materials recited supra). The outer two regions comprise channels (formed by chemical etching or laser ablation for example) to form substantially mirror-imaged channels. The outer regions are disposed either side of the inner region to form the triple region construction. The term 'substantially minor-image pair', includes a mirror image formed by the profile of the channels. As will be readily understood upon consideration of the present specification, the locations of the channels in both outer layers, will typically overlap sufficiently to allow secondary electrons generated by ion impacts, to exit the interface and reach the internal environment of the detector.

With regard to channels formed by chemical etching, the natural profile created by thereby is exploited. Chemical etching creates a substantially U-shaped profile. A U-shaped profile is regularly used in structures to effectively distribute mechanical load from the apex of the U to the rest of a structure (one example being in bridge construction). As such, the natural U-shaped profile of chemically etched channels, makes chemical etching a preferred process to use in the construction of braces, given the added mechanical strength to the overall transmission mode secondary electron emissive element.

Minoring the U-shaped profiles of both outer regions ensures that load is distributed no matter from which direction it originates.

Figure 8:
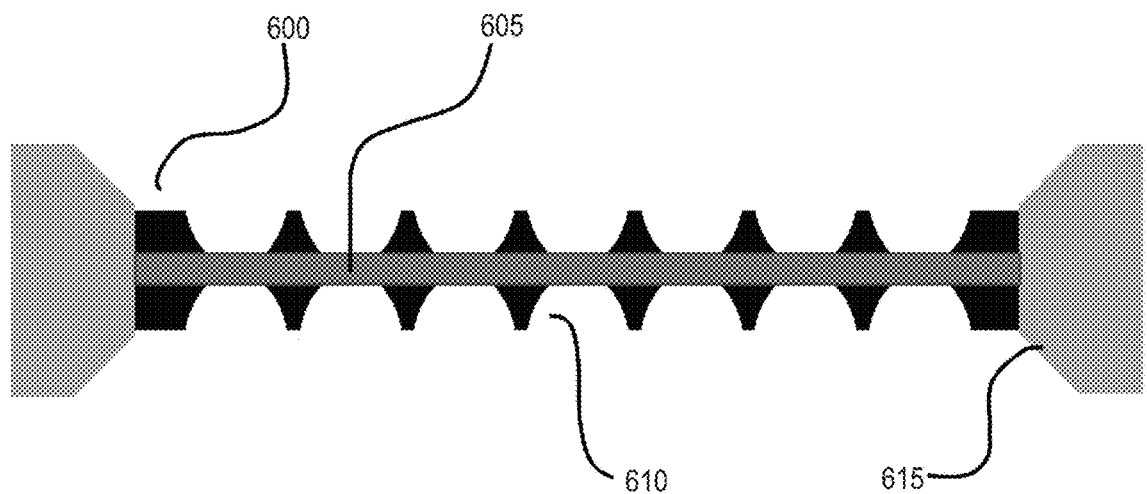
FIG. 8 illustrates highly diagrammatically, a channeled brace used in one embodiment of the invention as a transmission mode secondary electron emissive element.

A triple region arrangement is shown conceptually in FIG. 8, comprising a transmission dynode (605) is braced by a pair of mirrored layers (600, 610) that are formed by chemical etching. The mirrored layers (600, 610) are then then held so as to abut by way of a mounting element (610). The mounting element (610) may be a discrete element (such as a metal ring,) or may be incorporated into to the detector enclosure.

The present invention provides detector configurations that provide the operating voltage required of a transmission element, without necessarily requiring changes to the mass spectrometer. This allows for the novel use of a single transmission element, as an interface to a sealed or partially sealed detector.

There exist at least three generic configurations. The first configuration type is for line-of-sight detectors, as exemplified by the embodiments in FIG. 1 and FIG. 4. A line-of-sight detector is typically used because the ions or electrons have been accelerated by the mass spectrometer to energies so high, that they cannot be diverted by the voltages typically used in a detector's off-axis input optics. The present detectors may exploit this impact energy to trigger the transmission process of a transmission dynode element. As such, in this configuration the detector is fully sealed.

Figure 2:
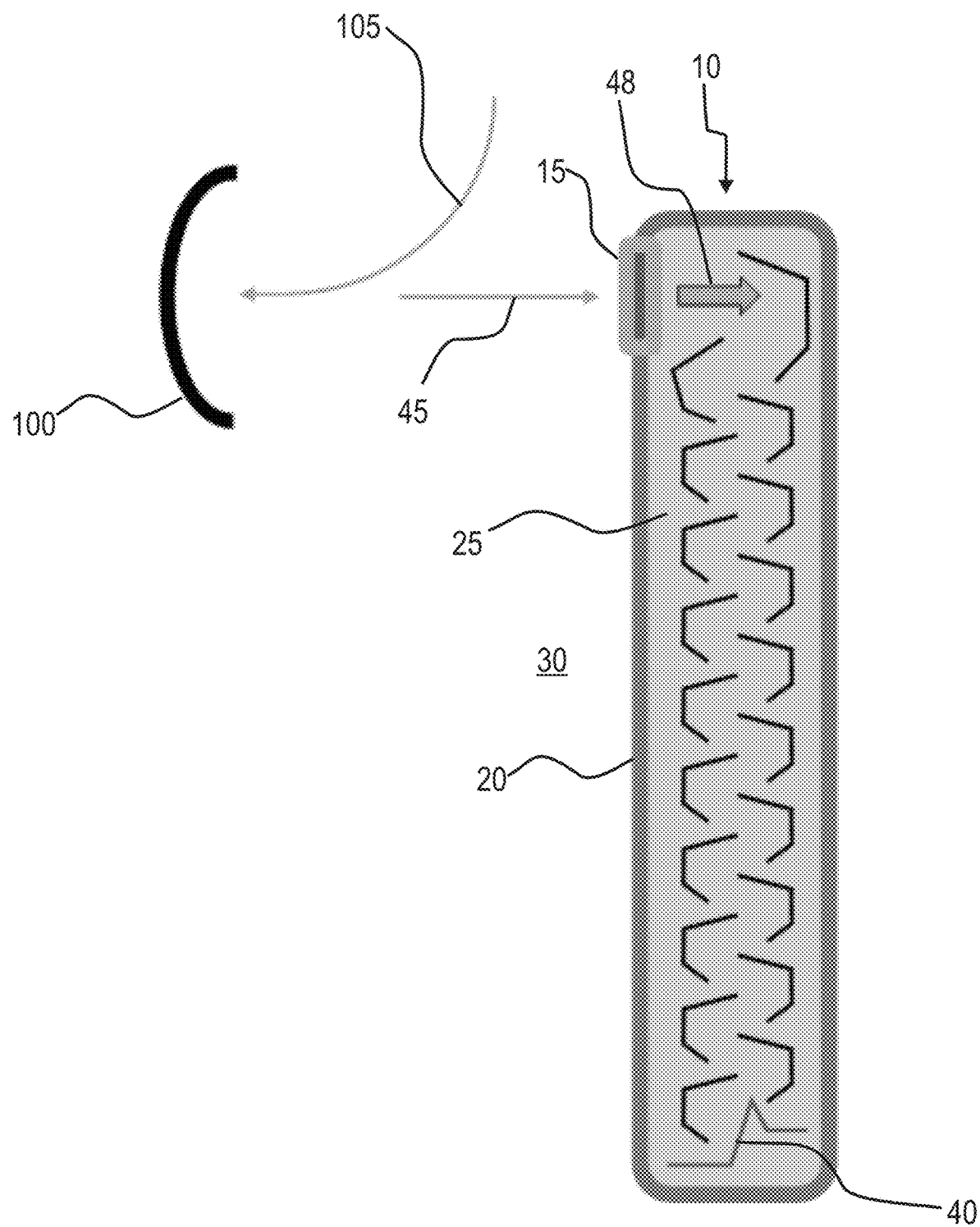
FIG. 2 illustrates highly diagrammatically the preferred substantially sealed particle detector drawn in FIG. 1 in operable association with a high energy reflection mode conversion dynode.

The second configuration type is for detectors incorporating a high energy dynode, as exemplified by the embodiment of FIG. 2. In this type of configuration the detector is fully sealed. The high voltage applied to the high energy dynode (>=5 kV, typically ~10 kV, but could be ~20 kV) relative to the detector (typically <=3.5 kV) is used to provide the necessary impact energy, by accelerating the secondary electrons emitted by a high energy dynode through a potential of at least several thousand volts.

Figure 3:
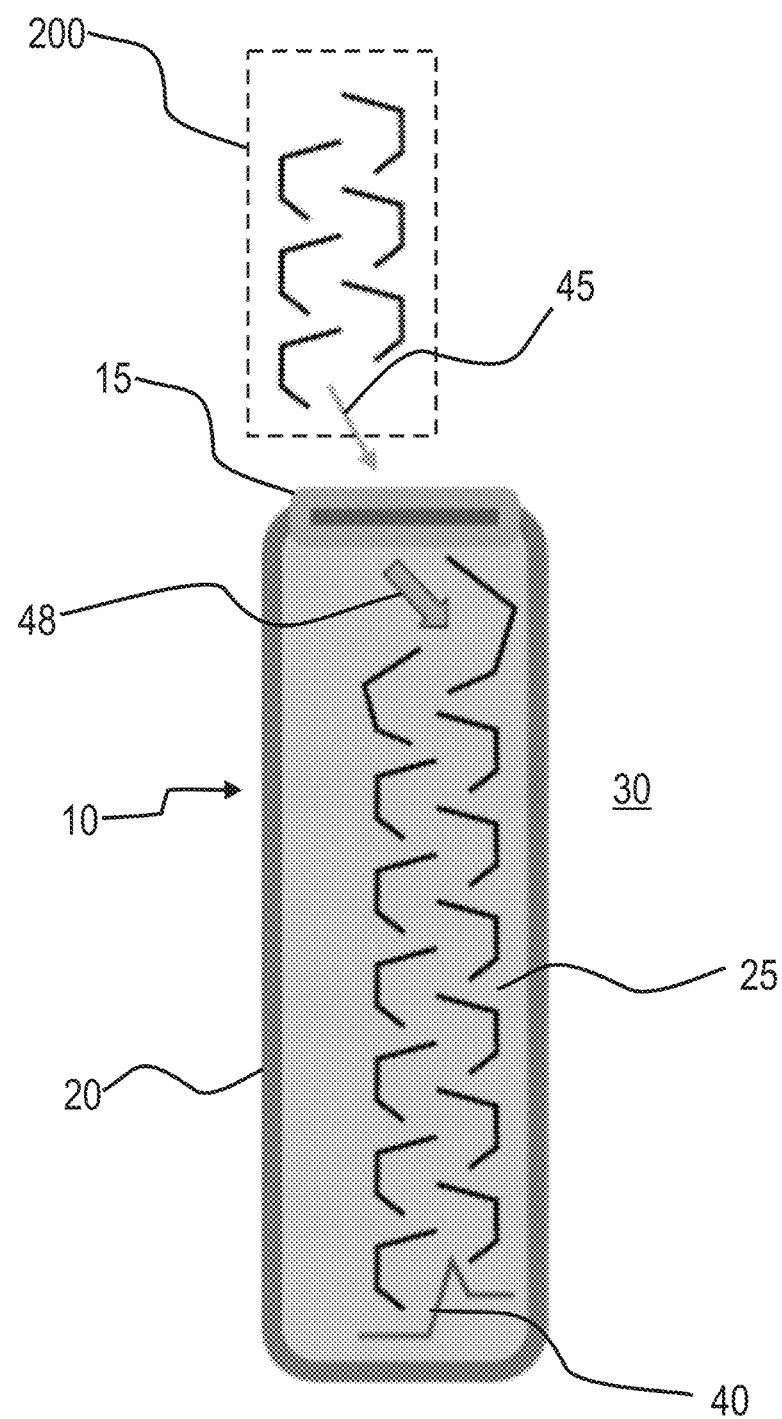
FIG. 3 illustrates highly diagrammatically the preferred substantially sealed particle detector drawn in FIG. 1 in operable association with a discrete dynode electron multiplier.
Figure 5:
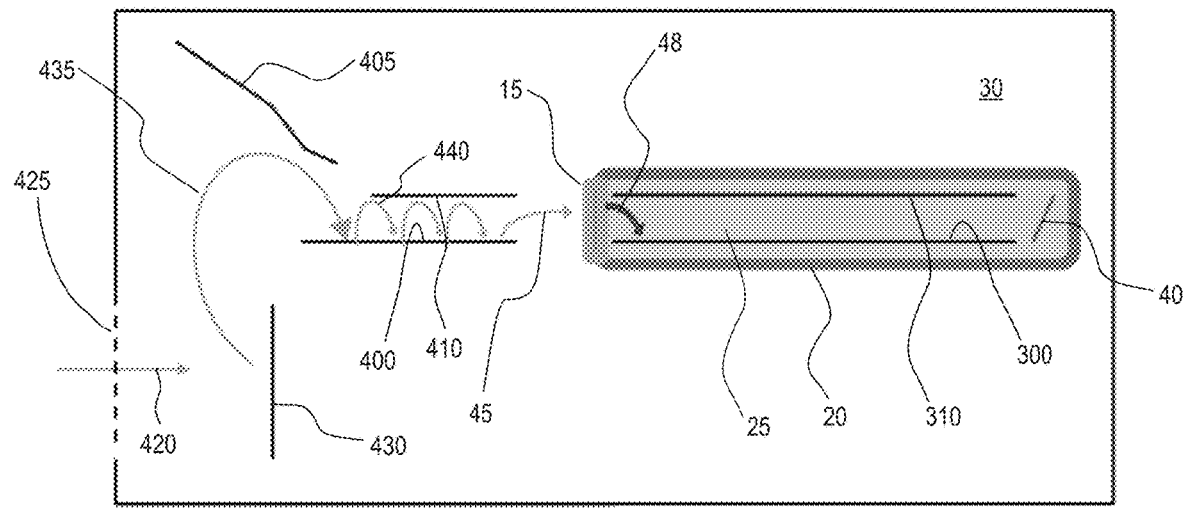
FIG. 5 illustrates highly diagrammatically, a further embodiment of the invention implemented in the context of a partially sealed magneTOF™ detector.

The third configuration partially seals the detector, as exemplified by the embodiments of FIG. 3 and FIG. 5. In this configuration the first part of the detector (which is unsealed), is used to amplify the initial ion/s or electron/s to a substantial number of electrons (2 to 1000). These electrons then impact the transmission element that is acting as the interface to the second, sealed part of the detector. These incident electrons only need to generate several electrons (~5) on the other side of the interface, for the sealed part of the detector to operate and generate an output signal. The required gain of this transmission element is therefore ~1 or even less than 1 e.g. 5 out/1000 in=0.005 gain. Reducing the required gain reduces the required operating voltage of the transmission element used as the interface. Alternatively, it is possible to use typical (>=1.5 kV) operating voltages and make the transmission element thicker. This in turn increases the mechanical and structural strength of the transmission element.

A benefit of at least some embodiments that are partially sealed (such as the third configuration described supra) is that interfaces with a gain less than 1 may be used, because the unsealed portion of the electron multiplier may be used to generate a sufficient number of incident electrons. In such embodiments, the present invention extends beyond the use of transmission mode interfaces of the type known at the present filing date. The interface may be based on a different type of physics to that used in present day transmission interfaces, with interfaces based on different type of physics nevertheless being included in the scope of the term "transmission mode secondary electron emissive element".

The present invention will now be more fully described by reference to the non-limiting examples presented in the accompanying drawings.

Reference is made to FIG. 1, showing a particle detector (10) of the present invention comprising a transmission mode dynode (15) and a walled structure (20). The combination of the walled structure (20) and the transmission dynode (15) forms an enclosure. The enclosure (15, 20) defines an internal environment (25) and an external environment (30).

Internal to the enclosure (15, 20), is a discrete dynode electron multiplier, two of the consecutive discrete dynodes in the chain marked (35*a*) and (35*b*). Also internal to the enclosure (15, 20) is a collector anode (40).

In operation, an ion exiting a mass analyser is directed along the path (45), so as to contact the externally facing surface (15*a*) of the transmission mode dynode (15). Impact of the ion causes emission of one or more secondary electrons from the internally facing surface (15*b*) along the path (45). The secondary electrons (not shown) travel along the chain of dynodes of the electron multiplier (two being marked 35*a* and 35*b*), from the upper region and downwards toward the last dynode in the lower region. After exiting the last dynode, the avalanche of secondary electrons impact on the collector anode to form a measurable electrical signal.

It will be noted that the enclosure (15, 20) essentially isolates the internal environment (25) of the detector (10) from the external environment (30). Accordingly the electron emissive surfaces (such as the dynodes 35*a*, 35*b*) and collector anode surface (40) may be maintained in a pristine environment. As will be appreciated, contaminants such as sample carrier gas species will be present in the external environment (30) given that the detector (10) is disposed within the vacuum chamber of a mass spectrometer.

It is proposed that because the detector of FIG. 1 does not rely on any scintillator, it accordingly overcomes or ameliorates the problem associated with photomultiplier tubes being the decay time of the meta-stable state induced in the scintillator when impacted by an ion or an electron, and the associated temporal noise. Accordingly, it is proposed that the detector of FIG. 1 will display improved timing resolution thereby conferring suitability in high-performance time-of-flight mass spectrometry. Furthermore, it would be expected that the production of non-Gaussian pulses with trailing tails will be avoided or at least lessened.

FIG. 2 shows an embodiment that comprises the same particle detector (10) as that shown in FIG. 1, combined with a high energy dynode (100). The high energy dynode (100) is operable in reflection mode and is configured to generate the necessary voltage to operate the transmission mode dynode (15). Ions or electrons may be directed along the path (105) to the high energy dynode (100). Secondary electrons emitted from the high energy dynode (100) impact the external face of the transmission mode dynode (15). Secondary electrons emitted from the internal face of the transmission mode dynode (15) travel in the general direction of the arrow (48) toward the first dynode of discrete dynode electron multiplier enclosed within the enclosure (15, 20) and are further multiplied.

The high energy conversion dynode may be any contrivance capable of emitting a secondary electron upon impact of a particle (such as a charged or uncharged atom, a charged or an uncharged molecule, a charged or an uncharged subatomic particle such as a neutron or a proton or an electron), and furthermore the contrivance having a relatively high electrical potential. The electrical potential may measure relative to ground, or to another component in electrical connection with the dynode as appropriate.

As is understood by the skilled artisan, the ion-to-electron conversion efficiency is proportional to the speed at which ions impact the surface of the conversion dynode. Accordingly, the conversion dynode is typically designed to increase the speed of the incident ions so as to optimize conversion efficiency as far as practicable.

FIG. 3 shows an embodiment that comprises a particle detector (10) operable on the same basis as that shown in FIG. 1, although the transmission mode dynode (15) is disposed across the long axis of the detector (10). Furthermore, in this embodiment it is combined with a discrete dynode electron multiplier (200). The avalanche of electrons exiting the discrete dynode electron multiplier (200) travel in the direction indicated by the arrow (45) to impact on the external face of the transmission mode dynode (15). Secondary electrons emitted from the internal face of the transmission mode dynode (15) travel in the general direction of the arrow (48) to impact on the first dynode of the discrete dynode electron multiplier enclosed within the enclosure (15, 20) and further multiplied.

Figure 4:
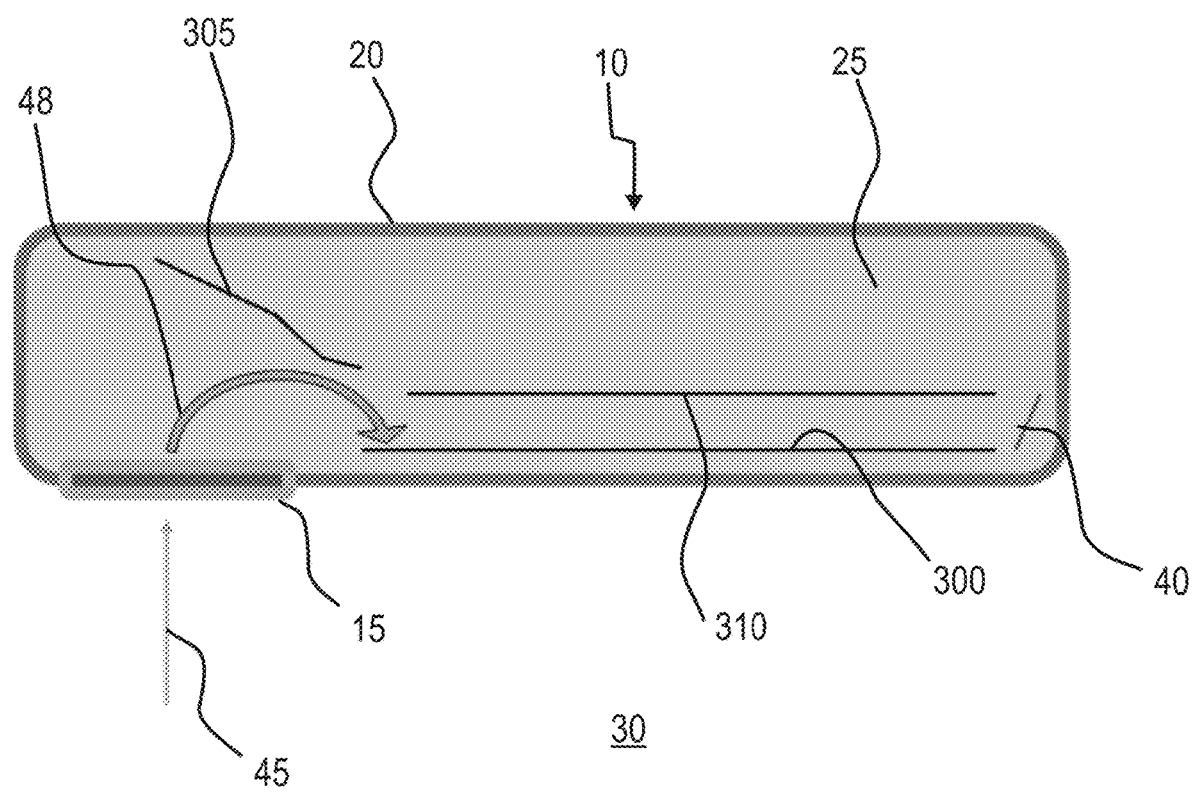
FIG. 4 illustrates highly diagrammatically, a substantially sealed particle detector similar that drawn in FIG. 1, except with a cross-field detector sealed within in place of the discrete dynode multiplier of FIG. 1.

FIG. 4 shows an embodiment that comprises a particle detector (10) that operates similar to the embodiments of FIGS. 1, 2 and 3, with the exception that secondary electrons emitted from the internal face of the transmission mode dynode (15) are directed generally in the direction of arrow (48) to the dynode plate (300) of a cross field detector. The deflection of secondary electrons along the arc (48) is effected by the combination of electric and magnetic fields used in cross-field detectors (305). As will be appreciated, the secondary electrons "bounce" along the dynode plate (300) under the influence of the magnetic and electric fields in the dynode plate region (310) and in that process multiply the secondary electrons emitted from the internal face of the transmission mode dynode (15). The avalanche of electrons so generated are collected at the anode (40). The cross-field detector is the same or similar to the magneTOF™ cross field detector as supplied by ETP Ion Detect Pty Ltd (Australia), later known as Adaptas Solutions Pty Ltd (Australia).

The embodiment of FIG. 5 is a partially sealed cross-field detector which may be the same or similar to the magneTOF™ cross field detector as supplied by ETP Ion Detect Pty Ltd (Australia), later known as Adaptas Solutions Pty Ltd (Australia). One portion of the detector is external to the enclosure (15, 20) and comprises cross-field detector components dynode plate (400), guiding electrode (405), and field plate (410). The function of this external portion of the detector is to generate electrons to impact the external face of the transmission mode dynode. These electrons are not intended to form part of the amplification process, but may incidentally contribute to amplification. The main function of these electrons is to act as sacrificial electrons to allow the use of a transmission mode dynode at low gain (about 1 or even less than 1). A gain of 1 or less than 1 allows for the use of either a thicker transmission mode dynode for a given voltage, or a smaller operational voltage for a given thickness. A combination of these two options can also be used.

Staying with the embodiment of FIG. 5, the detector which is represented by a magneTOF™ having a dynode plate (300), field plate (310) and collector anode (40) sealed inside the enclosure (15, 20). The arrow (420) indicates the direction of travel of ions travelling through a grid (425) at the magneTOF™ entrance. These ions then strike the magneTOF™ impact plate (430). This generates secondary electrons that travel to the magneTOF™ amplifying section, as shown by the arrow (435). As indicated by the series of arced arrows (one marked 440), the unsealed portion of the amplifying section amplifies the number of electrons. The arrow (45) shows the direction of these amplified number of electrons, which eventually impact the externally facing surface of transmission mode dynode (15). The arrow (48) indicates the direction of secondary electrons emitted from the internally facing surface of the transmission mode multiplier.

Figure 6:
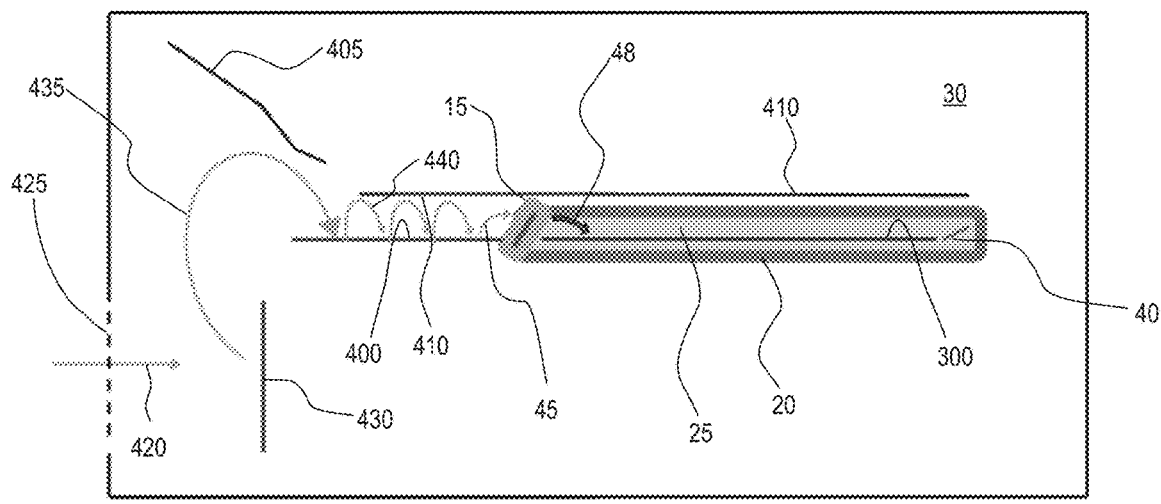
FIG. 6 illustrates highly diagrammatically, an alternative embodiment to that drawn in FIG. 5 in which only the collector/anode and part of the dynode strip is sealed inside the enclosure.

FIG. 6 shows an alternative embodiment to that drawn in FIG. 5, in which only the collector/anode (40) and part of the dynode plate (300) is sealed inside the enclosure (15, 20). To explain further, the totality of the dynode plate is represented by (400) and (300), and only the part denoted (300) is sealed within the enclosure (15, 20). It will be noted that the field plate (410) is continuous.

The present invention provides an alternative to a photomultiplier tube with a scintillator. In the present invention, a single element/layer from a transmission multiplier may replace the 'scintillator-to-glass-to-photocathode' structures and process. A prior art transmission multiplier consists of a stack of elements that emit secondary electrons when struck by charged particles. Unlike a conventional electron multiplier, these secondary electrons are emitted from the opposite side to the one that was impacted. This allows a single element from a transmission multiplier to be embedded into a tube and used as an interface. This interface generates electrons inside the tube when struck by ions and electrons from outside the tube.

As an alternative to prior art photomultiplier tubes, the present invention exhibits an important difference. It achieves superior time resolution, because a scintillator is not used. A scintillator ion-to-photon conversion process is a statistical process with a meta-stable decay time like radioactive decay. This adds additional noise to measurements of charged particle arrival times using a photomultiplier tube. Replacing the scintillator removes or limits this temporal noise. This makes the present detector more useful for time-of-flight mass spectroscopy than a photomultiplier tube.

However, because the present detector is essentially sealed (as is a photomultiplier tube) the detector will offer greater operating life, supress gain recovery and improve the general performance compared to discrete dynode, continuous/channel and cross-field detectors. Thus, the present invention overcomes or ameliorates the shortcomings of prior art photomultiplier tubes while exhibiting a similar service life.

While the present invention has been described primarily by reference to a detector of the type used in a mass spectrometer, it is to be appreciated that the invention is not so limited. In other applications the particle to be detected may not be an ion, and may be a neutral atom, a neutral molecule, or an electron. In any event, a detector surface is still provided upon which the particles impact.

Furthermore, for the avoidance of doubt the discrete dynode and magneTOF™ detectors in the embodiments illustrated should not be taken as limiting in any way. It will be obvious to one skilled in the art, from the drawings, that the configurations are applicable to continuous electron multipliers, multi-channel continuous electron multipliers or microchannel plate detectors.

It will be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. Functionality may be added or deleted from the diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

The invention claimed is:

1. A self-contained particle detector comprising:
an enclosure formed in part by a transmission mode secondary electron emissive element, the enclosure defining an internal environment and an external environment and the enclosure prevents or inhibits movement of a contaminant from the external environment to the internal environment, wherein the transmission mode secondary electron emissive element has an externally facing surface and an internally facing surface and is configured such that impact of a particle on the externally facing surface causes emission of one or more secondary electrons from the internally facing surface.

2. The self-contained particle detector of claim 1, wherein the transmission mode secondary electron emissive element has the structure and/or function of a transmission dynode.

3. The self-contained particle detector of claim 1, wherein the transmission mode secondary electron emissive element comprises two or more electron emissive sub-elements.

4. The self-contained particle detector of claim 3, wherein each of the two or more electron emissive sub-elements has the structure and/or function of a transmission dynode.

5. The self-contained particle detector of claim 1, wherein the enclosure comprises a walled structure, and the transmission mode secondary electron emissive element is substantially continuous with a wall of the walled structure.

6. The self-contained particle detector of claim 1, wherein the enclosure forms a sealed or a substantially sealed arrangement.

7. The self-contained particle detector of claim 1, comprising electron amplifier configured to amplify a secondary electron emitted from the transmission mode secondary electron emissive element.

8. The self-contained particle detector of claim 7, wherein the electron amplifier is an electron multiplier.

9. The self-contained particle detector of claim 8, wherein the electron multiplier is a discrete dynode electron multiplier, or a continuous electron multiplier, or a multi-channel continuous electron multiplier, or a cross-field, or a microchannel plate (MCP) detector.

10. The self-contained particle detector of claim 7, wherein the detector comprises an electron collector in operable association with the electron amplifier.

11. The self-contained particle detector of claim 10, wherein the electron collector is an anode.

12. The self-contained particle detector of claim 10, wherein the electron amplifier and the electron collector are contained wholly within the enclosure.

13. The self-contained particle detector of claim 1, configured as a component to replace a photomultiplier tube in a mass spectrometer or to replace a scintillation counter for radiation detection.

14. An apparatus comprising:
   a self-contained particle detector comprising an enclosure formed in part by a transmission mode secondary electron emissive element, the enclosure defining an internal environment and an external environment, wherein the transmission mode secondary electron emissive element has an externally facing surface and an internally facing surface and is configured such that impact of a particle on the externally facing surface causes emission of one or more secondary electrons from the internally facing surface; and
   (i) a conversion dynode, wherein the conversion dynode is in operable association with the self-contained particle detector such that a secondary electron emitted by the conversion dynode is capable of impacting the externally facing side of the transmission mode secondary electron emissive element; or
   (ii) an electron amplifier in operable association with the self-contained particle detector such that a secondary electron emitted by the electron multiplier is capable of impacting the externally facing side of the transmission mode secondary electron emissive element.

15. A method for detecting a particle, the method comprising:
   providing a self-contained particle detector comprising an enclosure formed in part by a transmission mode secondary electron emissive element, the enclosure defining an internal environment and an external environment and the enclosure preventing or inhibiting movement of a contaminant from the external environment to the internal environment,
   causing or allowing a particle to impact an externally facing side of transmission mode secondary electron emissive element which forms part of the enclosure, and
   causing or allowing the transmission mode secondary electron emissive element to emit a secondary electron from an internally facing side of the transmission mode secondary electron emissive element.

* * * * *